United States Patent
Gustafson

[11] Patent Number: 6,146,507
[45] Date of Patent: Nov. 14, 2000

[54] MANURE SLURRY PRE-TREATMENT METHOD AND APPARATUS

[76] Inventor: Guy M. Gustafson, 9735 Oakwood Dr., Chaska, Minn. 55318

[21] Appl. No.: 09/235,467

[22] Filed: Jan. 22, 1999

Related U.S. Application Data

[63] Continuation-in-part of application No. 08/774,312, Dec. 26, 1996, abandoned.

[51] Int. Cl.⁷ .................................................. C02F 1/461
[52] U.S. Cl. ..................................... 204/275.1; 205/688
[58] Field of Search .................................. 205/688, 742; 204/275, 275.1

[56] References Cited

U.S. PATENT DOCUMENTS

3,336,220  8/1967  Neidl et al. .
3,753,886  8/1973  Myers ..................................... 204/186

*Primary Examiner*—Arun S. Phasge
*Attorney, Agent, or Firm*—Robert A. Elwell

[57] ABSTRACT

A method and apparatus for pre-treatment of a fresh manure slurry stream. The method alters gas production during subsequent treatment or holding. The method passes the stream through a pre-treatment zone in which the slurry is subjected to alternating electrical current depositing energy from about $1.1 \times 10^{-2}$ J/cm³ to $4.1 \times 10^{-1}$ J/cm³. The apparatus includes first and second spaced apart electrodes of inert material which define a pre-treatment zone between the electrodes and preferably induce turbulence in the stream within the pre-treatment zone.

6 Claims, 3 Drawing Sheets

MANURE SLURRY PRE-TREATMENT METHOD AND APPARATUS

PRIOR APPLICATION

This application is a continuation-in-part of Ser. No. 08/774,312, filed Dec. 26, 1996 now abandoned.

BACKGROUND

The present invention relates to livestock husbandry and most particularly relates to pre-treatment of raw slurried animal waste, such as porcine manure slurry, to modify gas production during subsequent waste treatment or holding.

Disposal of livestock waste, as well as the unpleasant odor associated with storage or disposal of livestock waste, have long been recognized as a challenging problem. It is perplexing that although the feed material consumed by the animals often does not smell bad, the subsequent process of disposal of the waste or manure often evolves most disagreeable odors.

One way to handle the odor problem is to dehydrate the waste. Dehydration arrests the bacterial action associated with production of disagreeable odors from manure. Dehydration produces an inoffensive dried material that can be applied to fields as fertilizer. However, the equipment necessary to dehydrate manure is expensive and the operational fuel costs are economically staggering.

Another method to handle the problem of feedlot wastes is to add agricultural lime in sufficient quantities to remove the odor. A "sufficient quantity" of agricultural lime is approximately 1:1. A well-mixed mass makes an excellent agricultural field fertilizer. The problems associated with this method, in addition to the high cost of agricultural lime, are drying, mixing and application equipment.

In many modern feedlots or confinement facilities, livestock waste or manure is removed and conveyed as a slurry to a separate treatment area in order to save labor and money. Such a slurry is typically more concentrated than domestic wastewater. The slurry treatment continues to be plagued by odor problems. The extent of the odor problem has been exacerbated by the increased demand for livestock products and the increased human population in areas surrounding livestock farms. Moreover, increasingly large and dense livestock populations are characteristics of modern livestock production. Typically, the vapors that emanate from the waste are exhausted high into the air where they disperse during high pressure atmospheric conditions. However, during low pressure atmospheric conditions the vapors can settle to the ground miles from the building without dispersion. As a result, people who live or work near large livestock facilities are often subjected to a concentrated noxious odor and may even feel ill due to the odor. Consequently, there is a need for a method and apparatus to effectively reduce the odor of a manure slurry.

Some alternative methods for altering the characteristics of manure have been reported. For example, U.S. Pat. No. 4,200,505 discloses a process for treating animal waste to reduce the odor and to produce a useable animal feed supplement. The waste is treated with a direct ("DC") current to produce a bacteria-rich effluent which can be used as a feed supplement.

U.S. Pat. No. 4,654,071 discloses a process for treating a manure slurry to reduce the odor of the liquid manure. The liquid manure is treated by placing a copper electrode and a counter electrode in the liquid manure and introducing copper ions into the liquid manure by applying a DC current to the liquid manure from the copper electrode. However, the potentially toxic copper ions must be removed from the manure before the manure can be used, adding more time and expense to the process.

Presently, aerobic bacteria, often in treatment lagoons, are typically promoted to hold and treat manure slurries by digestion into a stable and non-objectionable end product. Localized or widespread anaerobic conditions sometimes also occur in the lagoon treatment process and thereby generate even more intense unpleasant odors. The aerobic bacterial mixed culture often includes many of the same bacteria that exist in the intestines of the confined or feedlot animals. By promoting aerobic bacteria in the treatment process, the process of digestion to a stable end product is accelerated but the objectionable odor production may also seem temporarily worse. Although the rate of objectionable gas generation is changed, the total quantity of potential odor remains the same because the total quantity of convertible matter available remains the same. Therefore, the modern livestock production operator often appears to face the dilemma of selecting between two generally unsatisfactory choices. These choices are to operate the treatment process to smell very bad for a shorter time period, or to operate the treatment process so as to smell moderately bad for a longer period of time. Ultimately the offensive odor of the treatment lagoon decreases as the sources of the odor become depleted and have been released into the atmosphere where it is dissipated and diluted. However, local breezes or the lack thereof can sometimes result in surprisingly strong zones of extremely unpleasant odor either adjacent the treatment lagoon or at a considerable distance from the treatment lagoon.

Bacteria break down the protein material in the manure and may liberate various gases including Methane ($CH_4$), Ammonia ($NH_3$), Hydrogen Sulfide ($H_2S$) and Carbon Dioxide ($CO_2$). The distribution is generally related to the extent of aerobic or anaerobic conditions in the lagoon. Methane is not water soluble so it is rapidly liberated into the atmosphere. Methane and Carbon Dioxide are both odorless so they are not offensive, but Methane is explosive and neither gas can sustain life and so must be dealt with when produced in high concentrations. Methane and Carbon Dioxide are also the primary Greenhouse gasses that are presently plaguing our planet. Ammonia, Hydrogen Sulfide and Carbon Dioxide are water soluble and tend toward slow release from lagoon waters. The pH of the lagoon water strongly influences the rate of release of these gases. Due to their solubility, these gases tend to accumulate in the lagoon and, thus, may create problems when later released. These effects are the main reason manure treatment lagoons can smell so bad.

Even though attempts to develop a method for reducing the odor of a manure slurry have been made, no effective, large scale method or apparatus has been successfully implemented. Therefore, there remains a need for a relatively inexpensive, effective method to treat a manure slurry that will significantly alter, and preferably reduce, the noxious odor associated with treatment or holding of the manure slurry.

SUMMARY OF THE INVENTION

Algae produce oxygen through photosynthesis. In order to rapidly, and inexpensively, make feedlot wastes inoffensive, the promotion of algae growth and algae production can be incorporated into a waste management or a waste treatment program, particularly programs involving lagoon treatment.

Algae cultures generally need not be added to a treatment lagoon because many forms of algae are available as spores in the atmosphere throughout the growing season. Certain fast reproducing forms such as Chlamydomonas, Euglena and Chlorella will grow to the exclusion of all other forms if the environment is conducive to algae growth. One of the primary constituents of confinement barn and feedlot wastes, as excreted, is Urea ($NH_2CONH_2$). The presence of Urea, above a threshold concentration, in manure slurries may prevent or inhibit algae growth. While not wishing to be bound by theory, the present invention is believed to modify gas production in a treatment lagoon, in part, by pre-treatment reduction of the Urea concentration in a fresh manure slurry. Where Urea prevents or inhibits algae growth, the likely resulting breakdown products of Urea, i.e. Ammonia and Carbon Dioxide, promote algae growth. Within hours of starting the pre-treatment of fresh manure slurries according to the present invention, the production of Hydrogen Sulfide from a treatment lagoon is reduced to barely perceptible levels and algae spontaneously establishes itself in 5 to 10 days in the normal growing season.

The algae feeds on both the manure and the bacteria and incorporates the Methane, Ammonia, Hydrogen Sulfide and Carbon Dioxide into its system binding them into amino acids and saccharides. By the action of photosynthesis, the algae link the amino acids into long polypeptide chains called proteins in hydrophobic reactions giving up water. Photosynthesis also combines Carbon Dioxide and water to produce saccharides but there is always Oxygen left over, so, where there was once bad smelling manure slurry, there is now protein, sugar, free oxygen and clean water. After about 30 days the total mass smells like new mown hay. Further pre-treated additions of excreta containing manure slurry are absorbed by the biomass of such a treatment lagoon without deleterious effect because the algae also produce enzymes that suppress bacterial activity and thereby reduce or prevent the generation of noxious gasses.

It is generally well known in the industry that algae is the answer to the problem, but it is not well known that concentrations of urea greater than about 1% inhibit the growth of algae. The present invention provides a method and apparatus for enhancing the growth rate of algae via the removal of urea and reducing the odor of a manure slurry by exposing the manure slurry to an alternating ("AC") electric current. In one embodiment of the present invention, the manure slurry, while flowing through a hollow chamber or pre-treatment zone, is contacted with a pair of electrodes. When an AC voltage is applied across the two electrodes, an electrical current is generated in the manure slurry. The actual shape and position of the electrodes are of significant consequence since the manure slurry passes between them and the applied voltage needs to be imparted generally uniformly to achieve process efficiency. Preferably, the flow is also turbulent within the pre-treatment zone defined between the electrodes. The resulting turbulent flow is believed to reduce or prevent localized regions or areas of excessive and insufficient current density or deposited energy within the pre-treatment zone.

In one embodiment, the present invention is method for pre-treating a fresh manure slurry stream to modify gas production during subsequent treatment. One step of the method includes providing a first electrode and a second electrode. The second electrode is separated from and electrically isolated the first electrode. Each of the electrodes is formed of a substantially inert, electrically conductive material and has a surface directed toward the other electrode. The surface of the first electrode and the surface of the second electrode define a pre-treatment zone situated between the surfaces. Other exposed surfaces of the electrodes may be optionally insulated to confine the current to the pre-treatment zone. This pre-treatment zone has a generally uniform or consistent thickness, i.e. spacing between the slurry contact surfaces of electrodes is uniform or consistent in distance, as opposed to having regions where the electrodes are closer and other regions where the electrodes are farther apart. A consistent or uniform thickness of the pre-treatment zone desirably facilitates application of current density and energy deposition consistently and uniformly to the entire portion of the manure slurry stream present in the pre-treatment zone at any given time. Most preferably the spacing or thickness of the pre-treatment zone is typically about ¼ of the diameter of the tube or pipe carrying the manure slurry stream to the pre-treatment zone. For example, if the stream is carried by a 2 inch inner diameter pipe, the preferred spacing between the electrodes, and therefore the thickness of the pre-treatment zone, would be about 0.50 inches. If the pipe was 6 inches inner diameter, the pre-treatment zone would be about 1.5 inches. The fresh manure slurry to be pre-treated flows through the pre-treatment zone as a stream. Preferably, the flow is turbulent. Turbulence is believed to discourage regions of high or low current in the pre-treatment zone.

While the slurry stream is flowing, an alternating current is applied, at a voltage of from about 20 volts to about 110 volts, to the first and second electrodes. This causes an alternating current of at least approximately 10 amps per inch of spacing within the portion of the fresh manure slurry stream in the pre-treatment zone. 10 amps (or just slightly more) per inch of separation is most preferred because of the economics of significantly exceeding that level of current. Preferably, the alternating current electrical energy deposited to the portion of raw manure slurry in the pre-treatment zone is from about $1.1 \times 10^{-2}$ $J/cm^3$ to about $2.6 \times 10^{-2}$ $J/cm^3$, more preferably from about $1.1 \times 10^{-1}$ $J/cm^3$ to about $4.1 \times 10^{-1}$ $J/cm^3$. Preferably, the flow rate of the fresh manure slurry stream through the treatment zone is from about 274 $cm^3$/sec to about 555 $cm^3$/sec. The method preferably exposes the fresh manure slurry in the treatment zone to a current density from about $4 \times 10^{-3}$ $amps/cm^2$ to about $1.3 \times 10^{-2}$ $amps/cm^2$. The alternating current may have a wave form selected from the group consisting of sinusoidal, square and sawtooth wave forms. The fresh manure slurry stream may include waste of porcine origin. It is expected that the method and apparatus would likely have utility in other highly concentrated livestock waste steams, particularly those with high urea concentration. Utility might be expected for bovine or avian originating manure slurries, however, domestic wastewater is typically too dilute to benefit from the present method.

The pre-treatment zone shape may be a conical shape, a frustoconical shape, a cylindrical tubular shape or a tubular box shape. Preferably, the pre-treatment zone is generally conical or frustoconical in shape, as such shapes are compatible with turbulent flow. The method also preferably includes causing turbulence in the fresh manure slurry such that the flow is turbulent while in the pre-treatment zone.

In another embodiment, the present invention is an apparatus for connection to an AC power source for pre-treating raw manure slurry streams. The device includes a first electrode, the first electrode formed of a substantially inert and electrically conductive material, and having a first slurry contact surface; a second electrode, the second electrode formed of a substantially inert and electrically conductive material, and having a second slurry contact surface. The two electrodes are held in a spaced apart relationship by a nonconductive body or housing, preferably tubular. The body carries the first and second electrodes in a spaced apart configuration, electrically isolated from each other, and with a generally uniform spacing between the first and second slurry contact surfaces, defining a pre-treatment zone between them. Leads are provided to connect to the power source.

Preferably, the nonconductive body includes an inlet and an outlet. The inlet and outlet are in fluid communication with the pre-treatment zone so as to direct passage of a manure slurry stream through the pre-treatment zone. The apparatus further might include an alternating current source electrically connected to both the first and second electrodes. Preferably, the first electrode extends radially inward from an interior surface of the nonconductive body and the second electrode is a conical body centered within the nonconductive body. The pre-treatment zone is preferably generally conical or frustoconical in shape. Preferably, the apparatus includes a method or means to induce turbulence in a slurry stream passing through the pre-treatment zone. Such means preferably involves the electrodes shape and relative positioning.

The present invention is also a method for agricultural waste management of a fresh manure slurry. The method of agricultural waste management includes the steps of: conveying a stream of the fresh manure slurry through a pre-treatment zone. The pre-treatment zone has a first electrode and a second electrode. The portion of the stream of the fresh manure slurry within the pre-treatment zone is continuously pre-treated as it passes through by applying an alternating current of not less than about 10 amps per inch of separation between the electrodes. The resulting stream of pre-treated manure slurry from the pre-treatment zone is conveyed to a treatment system, most likely a treatment lagoon, and digested. Preferably, the treatment lagoon includes a population of algae, typically a spontaneous culture of wild origin, the algae photosynthetically producing oxygen for consumption in the digesting step. Preferably, the method also includes the step of inducing turbulence in that portion of the stream of the slurry within and passing through the pre-treatment zone.

BRIEF FIGURE DESCRIPTIONS

FIG. 4b is a schematic perspective of the embodiment of FIG. 4a.

DETAILED DESCRIPTION

The present invention includes an efficient method for pre-treating a fresh manure slurry stream to modify gas production during subsequent treatment. This pre-treatment has utility because altering the gas production associated with subsequent treatment can enhance the growth rate of some or all microorganisms in, and/or reducing the odor associated with subsequent treatment of the manure slurry. By microorganisms herein is meant both bacteria and algae. The method includes exposing the manure slurry to an alternating ("AC") electric current of sufficient strength and for an sufficient amount of time to enhance the subsequent rate of growth of selected microorganisms, such as algae and/or bacteria. Increasing the growth rate of these microorganisms, and in particular, the growth rate of algae, leads to a reduction in the amounts of malodorous compounds, such as hydrogen sulfide, associated with the slurry. The apparatus used in conjunction with the present method is elegant in design and is inexpensively manufactured and maintained, yet easily incorporated into an existing manure removal system.

Figure 1:
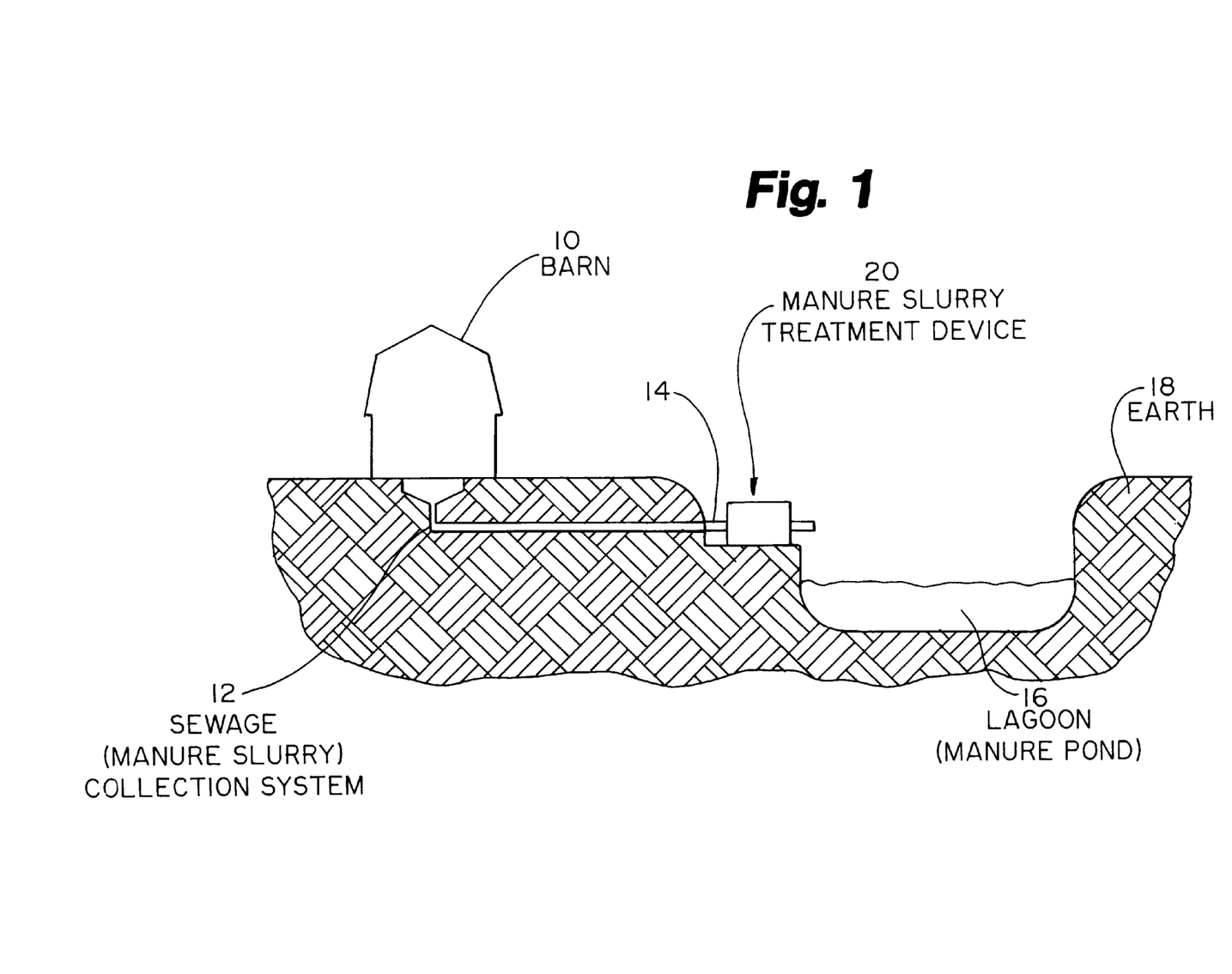
FIG. 1 is a schematic diagram showing the apparatus of the present invention installed for pre-treatment of a manure slurry stream originating from a barn and prior to entering a lagoon.

For example, as depicted in FIG. 1, on large swine farms, manure is typically flushed out of a barn 10 as a fresh slurry stream which passes through a manure handling system 12 which includes a relatively large diameter pipe 14 leading to a treatment lagoon 16 where the manure slurry is treated over time. These treatment lagoons 16 are often formed by a shallow excavated depression in the earth 18 and may optionally be lined with an impervious bottom layer. In a typical lagoon treatment process, the manure slurry is allowed to stand in the treatment lagoon 16 for a period of time. Unfortunately, the rate of decomposition of the manure is often slow, such that extremely unpleasant odors emanate from the treatment lagoon 16. These unpleasant odors can be carried by the wind for relatively large distances, thus creating a major nuisance for persons living in the surrounding areas.

Figure 2A:
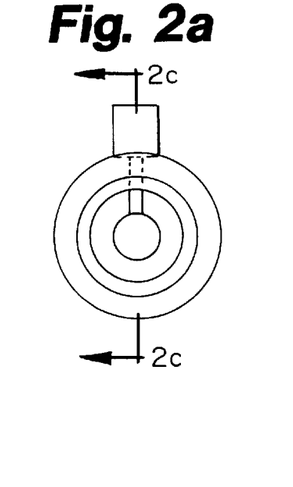
FIG. 2a is an end view of the apparatus.
Figure 2B:
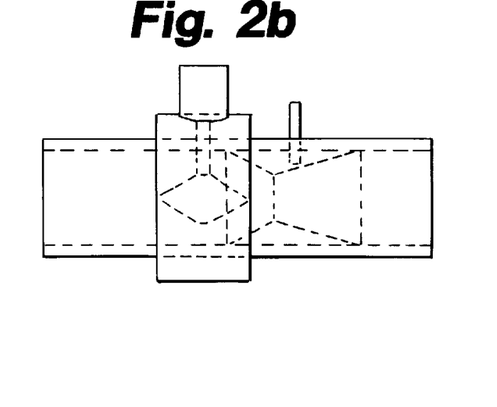
FIG. 2b is a side view of the apparatus.
Figure 2C:
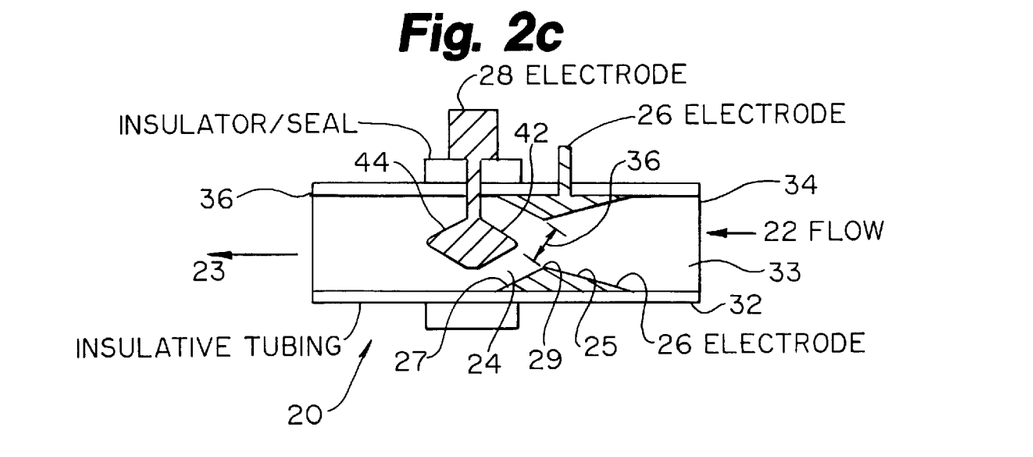
FIG. 2c is a longitudinal cross-section view of the apparatus of FIG. 1.

In one embodiment of the present invention, a method involves a fresh manure slurry stream flow 22 through a pre-treatment zone 24, as depicted in FIG. 2. The method of reducing the odor associated with the manure slurry includes contacting the manure slurry stream 22 with a first electrode 26 and a second electrode 28 and generating a voltage drop between the two electrodes 26 and 28 such that the manure slurry 22 is exposed to an electric field which results in the generation of an alternating electric current in the manure slurry 22. The voltage drop across the electrodes 26 and 28 should be capable of generating a sufficient alternating current to modify the gas production during subsequent treatment, for example in treatment lagoon 16. The sufficiency of the pre-treatment may be determined by observing an enhanced rate of growth of microorganisms and, in particular, observing an enhancement of the rate of algae growth and/or population in the pre-treated manure slurry 23 conveyed to the treatment lagoon 16. While there have been earlier reports of treatment of animal waste with a direct ("DC") current, it has been determined by the inventor that AC current is far superior to DC current in enhancing microbial growth in a manure slurry and, ultimately, in reducing the odor of the slurry. The inventor has found low levels of DC to be ineffective and have found that high levels of DC acts as a general disinfectant which kills beneficial microorganisms.

Additionally, high levels of DC causes aggregation of colloidal particles.

The alternating current used in the pre-treatment process should preferably be of sufficient amperage to modify the gas production during subsequent treatment, such that enhanced algae growth or algae population is produced in the pre-treated slurry 23 within a period of days. Suitable alternating currents vary in amperage dependent upon the resistance of the medium and the distance or spacing 30 between the electrodes 26 and 28. Typically, a sufficient amperage is just slightly greater than 10 amps AC per inch of separation distance 30 between electrodes 26 and 28, i.e. the thickness of the pre-treatment zone 24. For example, if the distance 30 between electrodes 26 and 28 is 0.75 inches, then the applied current should be slightly more than 7.5 amps AC or if the distance 30 between electrodes 26 and 28 is one half inch, then the applied current should be slightly more than 5.0 amps AC. The alternating current can be supplied in a variety of wave forms and frequencies above 20 hertz such as sinusoidal, square-wave, sawtooth, and the like, but typically common sinusoidal 60 hertz alternating current is employed. Frequencies below 20 hertz cause appreciable electrolysis which may form toxic by-products.

The voltage should be high enough to produce a current through the manure slurry 22 sufficient to alter organic components in the manure slurry 22. Preferably, the voltage ranges from about 20 V AC to about 60 V AC per inch and more preferably, higher voltages, such as 110 to 130 volts. Standard household current, typically 110 V AC, 60 Hz. alternating current, is preferred because it is typically available in an agricultural setting and therefore facilitates incorporation of the manure slurry pre-treatment apparatus 20 into an existing manure slurry removal system 12 and 14 bearing a manure slurry stream 22. Preferably, the apparatus 20 will be located and most preferably reversibly attached to an existing manure slurry removal system 12 and 14 so that it may be easily accessed to remove any obstructions or stoppages inadvertently lodging in or near the pre-treatment zone 24.

Generally, the manure slurry pre-treatment apparatus 20 includes a pre-treatment zone 24 which can be sized to fit within or replace a segment of a pipe 14 of the size carrying the manure slurry stream 22 from a hog confinement barn 10 to a treatment lagoon 16. Often, such a pipe 14 may be a plastic pipe, such as PVC pipe.

The pre-treatment zone 24 is defined by its location between two electrodes 26 and 28. The first electrode 26 is electrically isolated from the second electrode 28 and both electrodes 26 and 28 are electrically connected to an alternating current source (not shown). Preferably, the electrodes 26 and 28 are carried by a segment of tubing 32 or tubular body which is formed from an electrically non-conducting material which is easily machinable, such as polyvinyl chloride (PVC), Plexiglas®, nylon, Teflon®, polyethylene or polypropylene, but could be formed from glass, ceramic, and the like, although a polycarbonate material is preferred for small units and PVC is preferred for larger units. The hollow chamber 33 can have a cross section that is circular, rectangular, square, elliptical and the like. Typically, the flow tube 32 has a circular cross section.

The diameter of the flow tube 32 can be varied to accommodate a higher or lower rate of manure slurry flow 22. A larger diameter flow tube 32 is better at accommodating a larger volume of manure slurry 22 than a smaller diameter flow tube 32. It is preferred that the flow tube 32 have a diameter that may range from about 1.0 inch to about 10 inches, and more preferably, from about 3.0 inches to about 6.0 inches. The pre-treatment method and apparatus 20 could, of course, be employed with larger diameter flow tubes but such are generally not found on most livestock farms.

Figure 3:
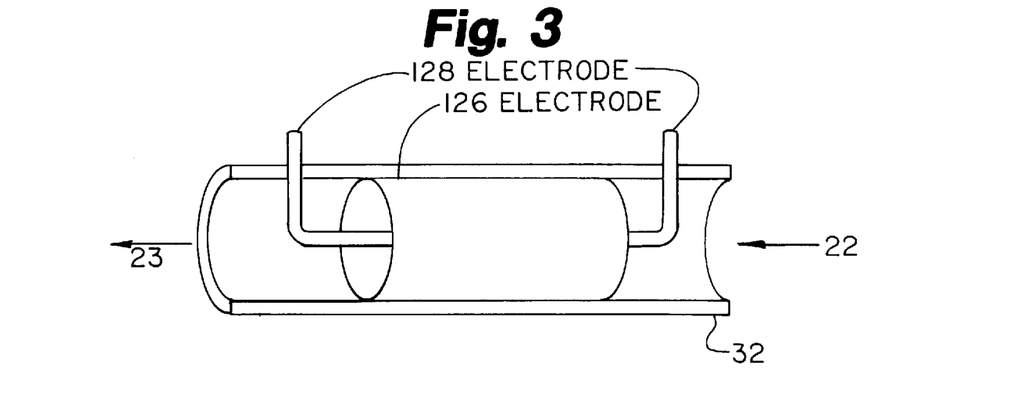
FIG. 3 is a schematic perspective view of an alternative embodiment of the present invention.

Preferably, the electrodes 26 and 28 are made from a chemically inert, conductive material such as tantalum or stainless steel, and the like. Stainless steel types SS303 and SS303 are most preferred as electrode materials. While the shapes of electrode 26 and 28 combinations can be made in many forms, preferred electrode combination forms are a venturi 26 and "bullet" 28 combination, as depicted in FIG. 2, or a conductive tube electrode 126 with a conductive rod electrode 128, most preferably with the rod electrode 128 generally centered within the conductive tube electrode 126, as depicted in FIG. 3.

In FIG. 2, Electrode 26 (the venturi) has two surfaces, the first 25 proximate the inlet end 34 is at an angle such that the constriction of the diameter of the flow tube 32 occurs gradually. As the first electrode 26 extends radially inward, the manure slurry 22 is forced through a smaller channel to an orifice or aperture 29 and hence, the flow rate of the manure slurry 22 through the treatment apparatus 20 is increased. Preferably, the first electrode 26 reduces the diameter of the flow tube 32 to about half of its original diameter. This is ¼ the cross sectional area of the flow tube 32, and the slurry is moving roughly 4 times the rate of the unobstructed flow tube 32. At this point, the venturi 26 opens out to it's second surface 27 proximate the outlet end 36. Most preferably, the venturi 27 is about 2.5 times the length of the inside diameter of the flow tube 32 with the length of the first surface 25 being 2 times the inside diameter of the flow tube 32 and the length of the second surface 27 being one half the inside diameter of the flow tube 32.

The second electrode 28 in FIG. 2, might be described as a bullet shape, and is located proximate the outlet end 36 of the flow tube 32. The second electrode 28 is a body located in, and most preferably centered in, the tube 32 which partially obstructs the flow path 22 of the manure slurry. Ideally the shape of the bullet 28 is similar to a pair of cones joined base to base, whose breadth is one half of the inside diameter of the flow tube 32 and whose length is one times the inside diameter of the flow tube 32. Flow 22 encounters conical surface 42 prior to conical surface 44. Since the cross sectional area at the mid point of the bullet 28 is ¾ the diameter of the flow tube, the speed of the manure slurry 22 at this point is ¼ faster than the unobstructed flow tube 32. Both the venturi 26 and the bullet 28 are attached by leads or opposite terminals attached to an alternating current source (not shown).

The function of the venturi 26 and bullet 28 are such that the flow of the manure slurry 22 through the venturi 26 becomes an elongated arrow head shape as seen with a manometer, due to the increasing speed and boundary layer turbulence. When passing the throat 29 of the venturi 26, the slurry stream's flow 22 strikes the bullet 28 at conical surface 42 and rapidly slows, thereby creating turbulation through the interspace or pre-treatment zone 24 between the electrodes 26 and 28, more precisely between conical surface 42 and surface 27 of the first electrode 26. There is a current path that exists between the nearest point of the two electrodes 26 and 28. There is a current path that exists from the foremost edge of the venturi to the farthest point of the bullet and an infinite number of current paths that exist in between. Optionally, surface 25 of the venturi electrode 26 and surface 44 of the bullet electrode 28 may be insulated to restrict the current path to the pre-treatment zone 24 between conical surface 42 of the bullet 28 and surface 27 of the venturi 26. These two surfaces 42 and 27 are generally parallel and uniformly spaced apart, as will be discussed further below.

Between the two electrodes 26 and 28, and defined thereby, is a pre-treatment zone 24. The pre-treatment zone 24 generally includes the various current paths between the two electrodes 26 and 28. The turbulence in a flow of a stream 22 passing through the pre-treatment zone 24 is generated, at least in part, by the electrode shape combination.

In the second embodiment (FIG. 3) the first electrode 126 is a conductive tube inside a non-conductive pipe or body 32. Preferably, the outer diameter of the first electrode 126 is just slightly smaller than the inner diameter of the non-conductive pipe 32, such that the electrode 126 is held by the non-conductive pipe 32. The second electrode 128 is a rod, preferably centered, in the tube 32 and within the first electrode 126 and both are connected to an alternating current power source. The lengths of the electrodes 126 and 128 should preferably be about three times the inside diameter of the flow tube 32. The current requirement is based on the distance between the electrodes 126 and 128, is approximately ten amps per inch or just slightly greater.

Figure 4A:
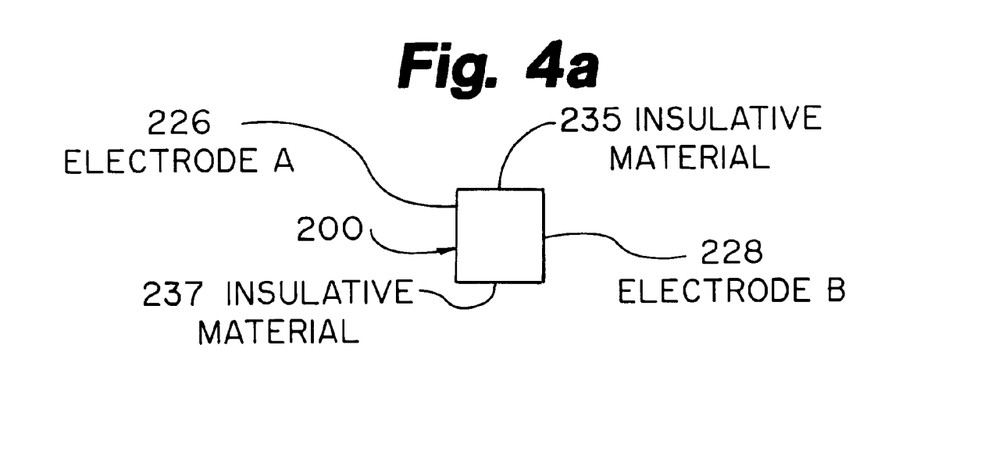
FIG. 4a is a end view of another alternative embodiment of the present invention.
Figure 4B:
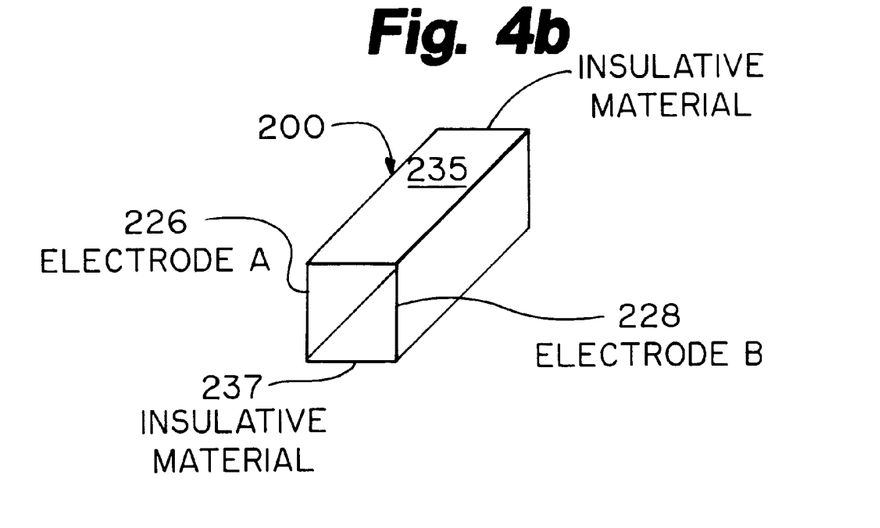

FIG. 4 is a schematic perspective of another alternative embodiment of the present invention. In this embodiment 200, two parallel planar electrodes 226 and 228 are spaced uniformly apart insulative walls 235 and 237. The two electrodes 226 and 228 and two insulative walls 235 and 237 together form a tubular body 232. Electrical alternating current is connected to the electrodes 226 and 228 to pre-treat manure slurry passing through a pre-treatment zone between the electrodes 226 and 228.

Because the current resulting from the voltage drop between the two electrodes 26 and 28, 126 and 128, and 226 and 228 is dependent upon the dimensions of the pre-treatment zone (e.g., internal diameters, shapes, spacing distance between the electrodes, and the surface area of each of the electrodes in contact with the manure slurry) and differences in the resistivity of the manure slurry, it should be noted that, because of the ionic nature of the electrolytes present in the manure slurry 22 and the dilution factor of the water added, that the resistance of the slurry 22 may vary from 0.2 ohms to 6 ohms per inch of separation. Above this resistance, the dilution of the fresh manure slurry is so great, and in particular, the urea concentration so low, that the pre-treatment is generally unnecessary and algae develops spontaneously.

It is also useful to evaluate the amount of energy deposited (Ed) in a particular volume of manure slurry because the use of energy as a parameter takes into consideration the residence time of the slurry within the volume of the pre-treatment zone. The energy deposited, Ed, in the pre-treatment zone volume is equal to power multiplied by the amount of time (t) it takes a slurry sample to pass through the pre-treatment zone volume. Ed=Pdt where time is equal to the distance (1) through the pre-treatment zone between the electrodes divided by the velocity of the slurry (v) (i.e., t=1/v). Preferably, the deposited energy density is from about $1.1 \times 10^{-2}$ J/cm$^3$ to about $2.6 \times 10^{-2}$ J/cm$^3$, more preferably from about $1.0 \times 10^{-2}$ J/cm$^3$ to about $4.1 \times 10^{-1}$ J/cm$^3$. Consequently, the flow rate (f) of the manure slurry through the pre-treatment apparatus and the residence time (t) of the manure slurry in the pre-treatment zone is important. The flow rate can be determined by multiplying the velocity of the manure slurry (v) by the cross sectional area (A) of the treatment apparatus. (f=vA). For a treatment apparatus with a diameter of about 7.62 cm (radius (r)=½ diameter and A=πr=119.6 cm$^2$), a flow rate with a magnitude from about 274 cm$^3$/sec to about 555 cm$^3$/sec (about 200–400 gallons per minute) is generally sufficient to handle the waste generated on a typical farm.

Without limiting the invention, it is believed that the electrical power dissipated in the pre-treatment zone between the two electrodes alters components which inhibit the rate of algae and/or bacterial growth and consequently alter the rate at which organic components associated with the unpleasant odor of the manure are assimilated by the algae. It is believed that exposure of the manure slurry to an AC current within the general guidelines of this invention results in a chemical transformation of some of the molecules present in the manure slurry. For example, urea is an organic component that may be altered when a manure slurry is treated according to the method of the invention. It is believed that the presence of urea in a manure slurry can inhibit the growth of bacteria and/or algae. Insufficient bacterial and/or algae growth may prevent the offensive odor components associated with the manure slurry from being decomposed by the bacteria or assimilated by the algae or, alternatively change the degradation pathway followed by the potential source of gas end products, including offensive gases. Consequently, if urea concentration is reduced by exposure to an AC current, bacteria and/or algae may grow more readily and the odor of the manure slurry is consequently decreased.

Additionally, exposure of a manure slurry to an AC current can result in the reduction of hydrogen sulfide ($H_2S$) produced by the manure slurry during subsequent treatment, such as treatment in a lagoon. It is believed that treatment of a manure slurry with an AC current may degrade hydrogen sulfide molecules initially present in the manure slurry, or the enhanced microbial growth which results from treatment with AC current may decrease the subsequent production of hydrogen sulfide. Hydrogen sulfide is a compound that is responsible, at least in part, for much the unpleasant odor of the manure slurry. In addition, hydrogen sulfide is typically used in environmental monitoring as an indicator of the overall level of noxious smelling airborne pollutants associated with manure treatment lagoons. Therefore, a reduction in treatment lagoon hydrogen sulfide production results in a reduction in the odor associated with the manure slurry during subsequent treatment in a lagoon. Additionally, reduction in hydrogen sulfide production is believed to be generally being indicative of an overall reduction in the total amount of unpleasant smelling compounds associated with lagoon treatment of the slurry.

The invention will be further described by reference to the following detailed examples. These examples are not meant to limit the scope of the invention, but to provide exemplary illustrations of the present invention. Variation within the concepts of the invention will be apparent to those skilled in the art.

EXAMPLES

The small pre-treatment apparatus used in the following examples was prepared from a one inch polycarbonate tube. Inside the tube were attached a pair of electrodes. The first electrode was shaped as a venturi with a one-half inch orifice and a conical transitional areas leading from the one inch tube to the orifice. The second electrode was generally bullet shaped, with a one half inch diameter. The generally uniform spacing between the contact surfaces of the electrodes was about ¼ inch. The electrodes were electrically separated from each other and connected to an AC power source by wire leads. To provide the appropriate minimal current of 10 amps per inch of separation space between the electrodes, the minimal operational current was 2.5 amps at 2.5 volts.

Example 1

On day 1, a batch of fresh porcine manure slurry "as excreted" was not pre-treated and kept as a control. On day 1, a second batch of "as excreted" fresh manure slurry was pre-treated with the small pre-treatment apparatus. More specifically, the batch was flowed through the small pretreatment apparatus as a stream. On day 1, a third fresh manure slurry batch was mixed with water in a 1 to 1 ratio (1:1) and then treated using the same apparatus as employed to pre-treat the second batch. On day 1, a sample was removed from both the un-pre-treated control batch and the "as excreted" batch and the "1:1" batch of manure slurry. The number of bacteria present in each sample was determined by counting the number of bacteria in a 1 mm×1 mm×0.1 mm field of view. The number of algae was determined by counting the number of algae that passed through a 1 mm×1 mm×0.1 mm field of view in one minute. The samples were vortexed before counting to insure an even dispersion within the sample. The data is shown in Tables 1 and 2.

TABLE 1

ALGAE COUNTS (1 mm × 1 mm × 0.1 mm & 1 minute)

| Day: | 1 | 7 | 12 | 14 | 16 | 19 |
|---|---|---|---|---|---|---|
| Untreated: | 0 | 0 | 0 | 0 | 0 | 0 |
| As excreted: | 0 | 3 | 5 | 5 | 6 | 7 |
| 1:1 : | 0 | 2 | 3 | 3 | 5 | 5 |

TABLE 2

BACTERIA COUNTS (1 mm × 1 mm × 0.1 mm)

| Day: | 1 | 7 | 12 | 14 | 16 | 19 |
|---|---|---|---|---|---|---|
| Untreated: | 20 | 25 | 75 | 75 | 125 | 125 |
| As excreted: | 20 | 175 | 250 | 300 | 300 | 350 |
| 1:1 : | 11 | 100 | 250 | 200 | 250 | 250 |

The results Tables 1 and 2 demonstrate that the treated samples showed significantly more bacterial growth and the appearance of algae in contrast to the untreated control.

Example 2

A porcine manure slurry was collected from a nearby farm on day 1. On day 2, three portions of approximately 5 gallons were separated from the manure slurry. The first 5 gallon "Control" portion of manure slurry was placed, without pre-treatment, in an open container, simulating a treatment lagoon to serve as a control. The container had a surface area of 1.6 square feet and a depth of about 0.5 feet. The second portion of manure slurry ("A") was pre-treated by passing it once through the small manure slurry pre-treatment apparatus with a flow of 1.88 gallons per minute and 2.5 amps of alternating current. The resulting pre-treated manure slurry was then placed in an open container similar to that used for the control. The third portion ("B") was passed through the small manure slurry pre-treatment apparatus. The average flow was 2.17 gallons per minute and the average current was 7.5 amps. The B batch was then placed in a third open container similar to that of the control and "A" portions.

Samples were then taken from each portion on days 2, 3, 4, 5, 8 and 9. Bacteria and algae counts were taken using the same method as described in Example 1. The data is provided in Tables 3 and 4.

TABLE 3

ALGAE COUNTS (1 mm × 1 mm × 0.1 mm & 1 minute)

| Day: | 2 | 3 | 4 | 5 | 8 | 9 |
|---|---|---|---|---|---|---|
| Control: | 0 | 0 | 0 | 0 | 0 | 0 |
| A | 0 | 0 | 0 | 0 | 1 | 0 |
| B | 0 | 0 | 0 | 0 | 7 | 3 |

TABLE 4

BACTERIA COUNTS (1 mm × 1 mm × 0.1 mm)

| Day: | 2 | 3 | 4 | 5 | 8 | 9 |
|---|---|---|---|---|---|---|
| Control: | 25 | 50 | 50 | 100 | 100 | 125 |
| A | 25 | 50 | 50 | 100 | 125 | 250 |
| B | 25 | 75 | 100 | 250 | 200 | 175 |

The results in Tables 3 and 4 demonstrate that the pre-treated manure slurry had significantly more bacterial growth than the untreated control. Algae growth was observed with both pre-treated portions while no algae was observed in the untreated control.

Example 3

Three portions of approximately 5 gallons were separated from the manure slurry. Approximately 5 gallons of a porcine manure slurry was placed in an open container with a surface area of 1.6 sq. ft. and a depth of about 0.5 ft. to serve as a "control" which was not pre-treated. A second portion of about 5 gallons ("C") of the manure slurry was pre-treated by passing it once through the small manure slurry pre-treatment apparatus with a flow of 3.5 gallons per minute and 3.5 amps of alternating current. The "C" portion was then placed in a container similar to that of the control. Finally, a third portion ("D") was passed through the small manure slurry pre-treatment apparatus. The average flow rate for "D" was 3.5 gallons per minute and the average current was 2.5 amps. The "D" portion was then placed in a third container similar to that of the control sample. After the three portions were exposed to the elements for 6 days, the amount of hydrogen sulfide released from each sample was determined. To measure the hydrogen sulfide released from each sample, a controlled volume was created by inverting a 600 ml container and placing it on top of the manure slurry such that the rim of the container was in contact with the surface of the manure slurry.

The hydrogen sulfide measurements were made using a Drager Gas Detector, which is a hand pump that contains a counting device. When the detector is pumped, a controlled amount of gas is pulled through a sensor tube which measures the amount of hydrogen sulfide present in parts per million. In this experiment, the tube from the Drager Gas Detector pump was inserted into an opening in the inverted container until the tube was approximately 3 inches above the manure. The Drager Gas Detector was then pumped 10 times. The hydrogen sulfide gas data is recorded in Table 5.

TABLE 5

HYDROGEN SULFIDE GENERATION

| Sample | Number of pumps | $H_2S$ (ppm) |
|---|---|---|
| Control | 10 | 2.25 |
| C | 10 | 1.75 |
| D | 10 | 1.00 |

The results in Table 5 demonstrate that the pre-treated samples produced less hydrogen sulfide gas during subsequent treatment. Because hydrogen sulfide is partly responsible for the offensive odor of a manure slurry under treatment in a lagoon, these results demonstrate that pre-treatment of a manure slurry using the present inventive method and apparatus modifies the gas production during subsequent treatment. In this example, the pre-treatment method reduced the most disagreable and potentially dangerous odor of hydrogen sulfide associated with porcine waste treatment lagoons.

TABLE 6

Table Showing Relationship Between Urea and Electrons

| | | | | | |
|---|---|---|---|---|---|
| Unit Diameter (in) | 3 | Flow (gpm) | 100 | Current (Amps) | 10 |
| Unit Diameter (ft) | 0.25 | | | | |
| Constriction Dia. (ft) | 0.1875 | Flow (ft³/s) | 0.00818 | Number of Electrons | 6.28E+19 |
| Ave. Contact Length (ft) | 0.75 | Velocity (ft/s) | 0.296402 | | |
| | | Contact Time(s) | 2.530347 | | |
| Manure Makeup | | Urea in Sol. | 0.1 | | |
| Liquids | 0.9 | Water in Sol. | 0.9 | | |
| Solids | 0.1 | Total Urea (lb/s) | 0.045939 | | |
| | | Total Water (lb/s) | 0.41345 | | |
| Volume/Second | | Urea (moles/s) | 0.347292 | | |
| Liquid (ft³) | 0.007362 | Water (moles/s) | 10.41876 | | |
| Solids (ft³) | 0.000818 | Urea (molecules/s) | 2.09E+23 | | |
| | | Water (molecules/s) | 6.27E+24 | | |
| | | Total (molecules) | 6.48E+24 | | |
| | | Ratio (urea/trons) | 3330.244 | | |

The present invention has been described with reference to various specific and preferred embodiments and techniques. However, it should be understood that many variations and modifications may be made while remaining within the spirit and scope of the invention, and the invention is not to be construed as limited to the specific embodiments disclosed in the specification. Because numerous modifications may be made of this invention without departing from the spirit thereof, the scope of the invention is not to be limited to the single embodiment illustrated and described. Rather, the scope of the invention is to be determined by appended claims and their equivalents.

What is claimed is:

1. An apparatus, for connection to an alternating current source, to pre-treat a raw manure slurry stream, the apparatus comprising:

a first electrode, the first electrode formed of a substantially inert and electrically conductive material, and having a first slurry contact surface;

a second electrode, the second electrode formed of a substantially inert and electrically conductive material, and having a second slurry contact surface;

a nonconductive tubular body, having an inlet and an outlet and carrying, between the inlet and the outlet, the first and second electrodes, the first and second electrodes being electrically isolated from each other in a spaced apart configuration with a generally uniform spacing between the first and second slurry contact surfaces, defining therebetween a pre-treatment zone, the pretreatment zone being in fluid communication with the inlet and the outlet;

leads connected to the first and second electrodes for connection to an alternating power source; and, wherein the first electrode extends radially inward from an interior surface of the nonconductive tubular body to an orifice and the second electrode is a conical body generally centered within the nonconductive body.

2. The apparatus of claim 1 and wherein the pre-treatment zone is generally conical or frustoconical in shape.

3. The apparatus of claim 2 and wherein the spacing between the first slurry contact surface of the first electrode and the second slurry contact surface of the second electrode is generally uniform.

4. The apparatus of claim 1 and wherein the cross-sectional area of the orifice of the first electrode is about ¼ the cross-sectional area of the tubular body and the cross-sectional area of the conical body of the second electrode is about ¼ the cross-sectional area of the tubular body.

5. The apparatus of claim 4 and further including:

means for inducing turbulence in a slurry stream passing through the pre-treatment zone.

6. The apparatus of claim 5 and wherein the means for inducing turbulence includes:

a restrictive opening orifice in the first electrode, the restrictive opening orifice equal to about ½ the diameter of the interior surface of the nonconductive tubular body;

wherein the conical body of the second electrode has a diameter of about ½ the diameter of the interior surface of the nonconductive body; and wherein the generally uniform spacing between the first and second electrodes is about ¼ the diameter of the interior surface of the nonconductive body.

* * * * *